Patented June 25, 1946

2,402,694

UNITED STATES PATENT OFFICE 2,402,694

CHEMICAL PROCESSES

Herbert G. Tanner, Wilmington, Del., assignor to E. I. du Pont de Nemours & Company, Wilmington, Del., a corporation of Delaware No Drawing. Application September 19, 1940, Serial No. 357,432

9 Claims. (Cl. 260—609)

This invention relates to catalytic hydrogenation processes and more particularly to the production of thiols by catalytic hydrogenation of organic sulfur compounds.

Organic sulfur compounds are steadily increasing in industrial importance. This is particularly true of thiols which are finding considerable use in rubber and dyestuffs manufacture. The present methods for obtaining thiols usually involve chemical reduction of oxygenated sulfur compounds. Catalytic reduction methods which have proved so successful in the reduction of sulfur-free organic compounds have been found impractical heretofore, because the usual hydrogenating catalysts are poisoned by the merest traces of sulfur or sulfur compounds.

It is an object of this invention to provide a simple and direct process for the reduction of organic sulfur compounds. Another object is to provide a new and improved catalytic process for the production of thiols. Still another object is the preparation of thiols from readily available raw materials. Other objects will be apparent from the following description of the invention.

These objects are accomplished by the following invention which comprises reacting an organic compound containing carbon and sulfur atoms adjacent to each other with hydrogen in the presence of an iron sulfide catalyst, preferably at a temperature not exceeding 300° C.

In practicing this invention the organic sulfur compound which may be dissolved in a suitable solvent is charged into a high pressure steel autoclave, together with an iron sulfide catalyst in finely divided form. The autoclave is then charged with hydrogen at superatmospheric pressure, agitated, and heated to the reaction temperature, usually from 100° to 300° C. depending upon the particular organic sulfur compound to be treated. The course of the reaction is conveniently followed by the decrease in pressure accompanying the absorption of hydrogen. When the desired amount of hydrogen has reacted, the autoclave is cooled and the contents filtered to separate the catalyst. The reaction products are then isolated by the usual methods of distillation or crystallization.

The following typical examples illustrate in detail the practice of this invention. The amounts of materials are in parts by weight, unless otherwise stated.

Example I

A sulfactive iron sulfide catalyst was prepared as follows: Ten parts of a finely ground alloy of equal weights of aluminum and iron were treated with 40 parts of boiling 25% aqueous sodium hydroxide for several hours to extract the aluminum, leaving the iron in finely divided pyrophoric form. The resulting iron was filtered from the solution, washed with water, and finally with methanol. Hydrogen sulfide was then passed through a methanol suspension of the finely divided iron at room temperature until no more sulfur was taken up. The resulting catalytically active iron sulfide was filtered from the excess methanol, stored, and used as a methanol paste.

Seven grams (dry basis) of the above catalyst together with 60 parts of cyclohexanone and 35 parts of powdered sulfur were charged into an autoclave. Hydrogen was then charged into the autoclave to a pressure of 1500 lbs./sq. in. and the autoclave agitated and heated to 150° C. At this temperature a rapid reaction ensued, as evidenced by the decrease in pressure, and it was necessary to add more hydrogen from time to time to replace that absorbed. After three hours the total pressure drop had amounted to 1800 lbs./sq. in., and the reaction was complete. The autoclave was cooled, the products filtered to separate the catalyst, and the filtrate blown with nitrogen to remove excess hydrogen sulfide. Distillation of the filtrate yielded cyclohexanethiol, b. p. 90° C./100 mm., in an amount corresponding to 88% conversion of the cyclohexanone.

The reactions by which the cyclohexanethiol is formed may be formulated as follows. The sulfur is hydrogenated first to hydrogen sulfide by the iron sulfide catalyst:

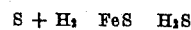

The hydrogen sulfide so formed reacts with the cyclohexanone to form the thioketone:

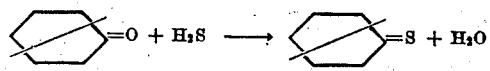

The thioketone is then hydrogenated to cyclohexanethiol by the iron sulfide catalyst:

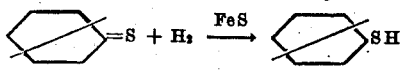

Example II

The following experiment illustrates the formation of the active iron sulfide catalyst in situ. Finely divided pyrophoric iron was prepared by extracting the aluminum with boiling sodium hydroxide solution from a finely ground alloy of equal weights of iron and aluminum. The iron powder so formed was washed free from alkali and aluminum salts with water, then washed with alcohol, and used in the form of an alcohol paste containing 50% of iron. Instead of preforming the iron sulfide as illustrated in Example I, the active iron sulfide was formed by sulfidation of the iron in the hydrogenation autoclave as follows.

Sixty parts of commercial cyclohexanone and 48 parts of sulfur were charged into the autoclave together with 16 parts of the alcohol paste of pyrophoric iron. Hydrogen was admitted to the autoclave to a pressure of 2000 lbs./sq. in. and the autoclave was shaken and heated to a temperature of 150° C. during ½ hr. Reaction was very rapid and hydrogen was added from time to time to maintain the total pressure within the range from 1200 to 2600 lbs./sq. in. After 1½ hrs. at 150° C. the reaction was complete. The cyclohexanethiol so produced was isolated as described in the preceding example. The yield was 89%.

*Example III*

One hundred eight parts of a crude mixture of naphthyl sulfides containing a substantial proportion of dinaphthyl disulfide obtained by reacting naphthalene with sulfur monochloride in the presence of zinc chloride was dissolved in 90 parts of benzene and charged into an autoclave together with 10 parts of an iron sulfide catalyst prepared by the following procedure. A solution of 24 parts of sodium sulfide nonahydrate and 6.4 parts of sulfur dissolved in 150 parts of water was added with stirring to a solution of 20 parts of ferric chloride hexahydrate dissolved in 100 parts of water. The black precipitate which formed was washed several times with water and then stirred and washed with dioxane to remove most of the water. Finally the precipitate was heated with an excess of benzene to remove the dioxane and last traces of water. The catalyst was used as a benzene paste. The autoclave was then charged with hydrogen to a pressure of 400 lbs./sq. in. and agitated and heated at 150° C. Hydrogenation ensued as evidenced by a decrease in the pressure during the first hour. Thereafter the reaction became slower and the temperature was raised to 200° C. and maintained there for an additional two hours, after which time no further decrease in pressure was noted. The autoclave was cooled and the contents rinsed out with benzene and filtered to separate the catalyst. The benzene was distilled from the product, leaving as the less volatile portion 89 parts of a yellow oil. Titration of a sample with standard iodine solution indicated the oil to contain 64% of thionaphthols. This transformation is represented by the following equation:

$$RSSR + H_2 \xrightarrow{FeS_x} 2RSH$$

*Example IV*

One hundred parts of pentadecanone-8, 33 parts of powdered sulfur, 45 parts of acetic acid, and 15 parts of iron sulfide catalyst were charged into a high pressure autoclave. The catalyst was prepared by adding a solution of 40 parts of sodium sulfide nonahydrate in 150 parts of water to a stirred solution of 47 parts of ferrous sulfate heptahydrate in 125 parts of water. The black precipitate was filtered, washed with water to remove the soluble salts and finally washed with alcohol to remove the water, and used as the alcohol paste. The autoclave was charged with hydrogen to a pressure of 1500 lbs./sq. in. and agitated and heated to 150° C. After the initial rapid reaction had subsided, as evidenced by the decrease in the rate of pressure drop, the temperature was raised to 200° C. for 5 hours. Hydrogen was added to the autoclave as needed to maintain the total pressure in the range from 1400 to 1800 lbs./sq. in. The autoclave was cooled and the contents filtered to separate the catalyst. The liquid product was blown with nitrogen to remove the excess hydrogen sulfide. Titration of an aliquot with iodine solution indicated the presence of pentadecanethiol-8 in an amount equivalent to 46% conversion of pentadecanone-8.

*Example V*

An aromatic sulfo-acid derivative was catalytically hydrogenated to a thiophenol as follows. A high pressure autoclave was charged with sixty-five parts of the solid dehydrated sodium salt of p-toluene-sulfinic acid, 25 parts of powdered sulfur, 7 parts of finely divided activated iron and 100 parts of water. The activated iron was prepared as described in Example II. The autoclave was charged with hydrogen to a pressure of 1000 lbs./sq. in. and agitated and heated to 100° C. during ½ hour. The pyrophoric iron reacted with the sulfur to form an active iron sulfide catalyst. The autoclave was then further heated at 175° C. for 4 hours. Additional hydrogen was added to maintain the total pressure between 800 and 1600 lbs./sq. in. The hydrogen absorbed corresponds to a pressure drop of 1800 lbs./sq. in. The temperature was then raised to 200° C. for 1 hour to insure complete reaction but no further pressure drop occurred. The autoclave was cooled, the contents rinsed out with water and filtered to separate the catalyst. The aqueous solution of products was acidified with dilute sulfuric acid and extracted with ether. Evaporation of the ether extract yielded 32 parts of crystalline p-thiocresol, M. P. 41° C. The yield was 85%. This reduction is formulated as follows:

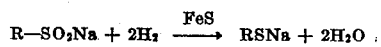
$$R-SO_2Na + 2H_2 \xrightarrow{FeS} RSNa + 2H_2O$$

*Example VI*

One hundred twenty-five parts of lauronitrile, 45 parts of powdered sulfur and 10 parts of finely divided pyrophoric iron prepared as described in Example II were placed in an autoclave. The autoclave was charged with hydrogen to a pressure of 1500 lbs./sq. in. and heated at 175° C. while being agitated. Additional hydrogen was added from time to time to replace that absorbed. After 4 hours no further pressure drop occurred and the autoclave was cooled, the contents filtered to separate the catalyst, and the filtrate distilled at reduced pressure. After removing a foreshot of lauronitrile there was obtained a liquid fraction of 90 parts of pure dodecanethiol-1 boiling at 95–96° C. at 1–1.5 mm. The yield was 65%. Some less volatile by-products were also obtained as a distillation residue. The formation of the thiol may be formulated as follows:

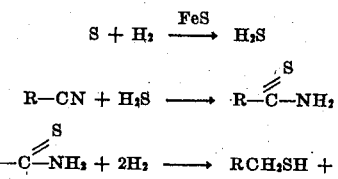
$$S + H_2 \xrightarrow{FeS} H_2S$$
$$R-CN + H_2S \longrightarrow R-\overset{S}{\overset{\|}{C}}-NH_2$$
$$R-\overset{S}{\overset{\|}{C}}-NH_2 + 2H_2 \longrightarrow RCH_2SH + NH_3$$

The foregoing examples illustrate the hydrogen reduction of several typical organic sulfur compounds to thiols. Broadly this invention includes the hydrogenation of other classes of sulfur compounds to thiols as illustrated by the following equations in which R and R' represent aliphatic, alicyclic, or aromatic hydrocarbon radicals or hydrocarbon radicals bearing substituent groups such as hydroxyl, halogen, carboxyl or carboxyl derivative, carbonyl, cyano, ethylenic or acetylenic groups.

1. Aromatic sulfonic acids and derivatives such as the esters, amides, salts, and the like:

(a) $R-SO_3Na + 3H_2 \longrightarrow R-SH + NaOH + 2H_2O$ (b) $R-SO_2-NR'_2 + 3H_2 \longrightarrow R-SH + HNR'_2 + 2H_2O$ 2. Aromatic sulfinic acids and derivatives such as the salts, esters, amides, etc.

(a) $R-SO_2Na + 2H_2 \longrightarrow RSH + NaOH + H_2O$

3. Thioaldehydes, thioketones, and their polymers and sulfhydrates.

(a) 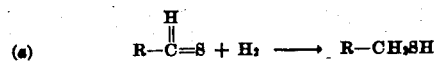

(b) 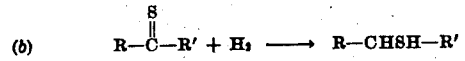

(c) 

The thiocarbonyl compounds may be formed and hydrogenated in one operation:

(d) 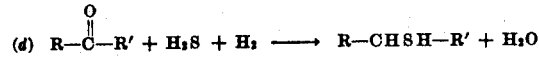

4. Thioamides or other nitrile-hydrogen sulfide reaction products:

(a) 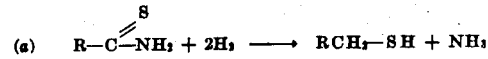

The thioamides or other nitrile-hydrogen sulfide reaction products may be formed and reduced in a single operation:

(b) $R-C\equiv N + H_2S + 2H \longrightarrow RCH_2-SH + NH_3$

5. Aromatic mono-, di-, and polysulfides, e. g.:

(a)  $R-S-R + H_2 \longrightarrow RSH + RH$ (b) 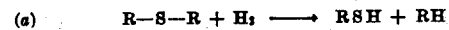 $R-S-SR + H_2 \longrightarrow 2RSH$ (c) 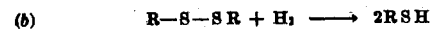 $R-S-S_x-R + XH_2 \longrightarrow 2RSH + (X-1)H_2S$ In carrying out the hydrogen reduction of sulfur compounds to thiols different conditions of temperature and pressure may be employed depending upon the particular type of sulfur compounds used as starting material. Generally, the process may be operated at hydrogen pressures ranging from 100 lbs./sq. in. upwards and preferably within the range from 500–3000 lbs./sq. in. when operating in the liquid phase. Usually it is preferred to operate in the liquid phase due to the low volatility of most of the unreduced sulfur compounds. The temperatures employed generally range from 100° C. to 300° C. It is preferred to operate at or near the minimum temperature required for reduction so as to avoid the secondary reaction of hydrocarbon formation:

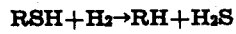
$RSH + H_2 \rightarrow RH + H_2S$

It has been found that this secondary reaction occurs most readily in the case of the aromatic thiols so that when hydrogenating aromatic sulfur compounds such as sulfonic acid derivatives which require temperatures of 200° C. or above, it is usually desirable to interrupt the reaction when the theoretical amount of hydrogen has been absorbed. Aromatic di- and polysulfides, thiocarbonyl compounds, thioamides, and aromatic sulfinic acid derivatives are usually hydrogenated at temperatures from 150 to 200° C. The aromatic sulfonic acid derivatives and aromatic thioethers (monosulfides) generally require temperatures ranging from 200° C. to 300° C.

Solvents may be used if desired, particularly to advantage in the case of solid compounds melting higher than the desired hydrogenation temperature. Examples of solvents that may be used are water, alcohols, ethers, and hydrocarbons. Other substances such as alkalis, organic acids or amines may also be present. When it is desired to combine in one operation the formation of the organic sulfur compound with its reduction to a thiol, it is necessary to carry out the reaction in the presence of hydrogen sulfide or substances convertible to hydrogen sulfide under the reaction conditions such as elementary sulfur, carbon bisulfide, and sulfur dioxide as is illustrated in some of the foregoing examples.

The iron sulfide catalysts used in the practice of this invention may be of several types including ferrous and ferric mono-, di-, and polysulfides. Several methods may be used to obtain the sulfides in catalytically active form. Active catalysts are obtained by precipitating the sulfide from solutions of ferrous or ferric salts with hydrogen sulfide, alkali or alkaline earth metal sulfides or polysulfides, or ammonium sulfide or polysulfide. Another method that yields an especially active iron sulfide catalyst is to treat finely divided pyrophoric metallic iron suspended in an inert liquid medium at moderate temperatures with hydrogen sulfide or sulfur dissolved in a solvent such as benzene. The sulfidation of iron to iron sulfide may be carried out conveniently in the hydrogenation apparatus and in the presence of the material to be hydrogenated as illustrated in some of the examples. The finely divided pyrophoric iron may be obtained by extracting the aluminum from a finely ground alloy of aluminum and iron with hot aqueous alkali. Still another method for obtaining iron sulfide catalysts is to heat at elevated temperatures, ordinary iron powder or filings or iron compounds such as the oxides in an atmosphere of hydrogen sulfide, sulfur or other volatile sulfiding agents. The iron sulfide catalysts are frequently rendered more active by heating the sulfide in hydrogen. Such hydrogen treatment may effectively be carried out in conjunction with the hydrogenation operation for which the catalyst is used.

The catalyst may contain other materials in addition to the iron sulfide such as metal sulfides or oxides. It is frequently desirable to have the iron sulfide mixed with a supporting material such as kieselguhr, alumina and the like. For batch hydrogenation operations the catalyst should of course be in finely divided form. When a flow process is to be operated the catalyst is preferably briquetted or otherwise formed in lumps or pellets. The proportion of catalyst used may be varied depending upon the activity of the particular catalyst and the type of material to be hydrogenated. Generally from 1 to 25% and usually from 3 to 10% of catalyst by weight based on the hydrogen acceptor brings about hydrogenation at a satisfactory rate.

Pure hydrogen or hydrogen mixed with other gases such as nitrogen, carbon monoxide or hydrogen sulfide are suitable reducing gases for carrying out the process of this invention.

The process of this invention is useful as an economical method suitable for manufacturing on a commercial scale a large variety of organic thiols many of which have important industrial uses either as intermediates in the manufacture of other materials or directly in such fields as insecticides and rubber chemicals.

As many apparently widely different embodiments of this invention may be made without departing from the spirit and scope thereof, it is to be understood that I do not limit myself to the specific embodiments thereof except as defined in the appended patent claims.

I claim:

1. A process for the production of thiols which comprises bringing a compound selected from the class consisting of organic sulfur compounds in which the sulfur is joined to the organic radical by a plural bond, organic sulfur compounds in which the sulfur forms the bridge between organic radicals, and organic sulfur compounds containing a sulfur-oxygen bond in which the sulfur is linked directly to an organic radical into contact with hydrogen, in the presence of a catalyst containing as an essential catalytic component iron sulfide, at a temperature between 100° and 300° C. and at a pressure in excess of 100 lbs. per sq. in.

2. The process for the production of thiols which comprises bringing an organic sulfur compound selected from the class consisting of those in which the sulfur is joined to the organic radical by a plural bond, those in which the sulfur forms the bridge between organic radicals, and those containing a sulfur-oxygen bond and in which the sulfur is linked directly to an organic radical and hydrogen into contact with iron sulfide at a pressure in excess of 100 lbs. per sq. in. and at a temperature near the minimum required for reducing the sulfur compound to a thiol and within the range of 100° to 300° C.

3. The process in accordance with claim 1 characterized in that the iron sulfide is obtained by precipitation.

4. The process in accordance with claim 1 characterized in that the iron sulfide is obtained by precipitation of a water-soluble iron salt with a soluble sulfide selected from the group comprising alkali metal sulfides and ammonium sulfides.

5. The process in accordance with claim 1 characterized in that the iron sulfide is obtained by precipitation of a soluble iron salt with a sodium sulfide.

6. The process in accordance with claim 1 characterized in that the iron sulfide is obtained by treating a member of the group comprising metallic iron, iron oxide, iron hydroxide, and iron sulfide with a volatile sulfiding agent.

7. The process in accordance with claim 1 characterized in that the iron sulfide is obtained by treating finely divided pyrophoric iron metal with a sulfiding agent selected from the group comprising hydrogen sulfide, elementary sulfur, and carbon bisulfide.

8. The process in accordance with claim 1 characterized in that the catalyst has been treated with hydrogen at elevated temperatures prior to the reaction.

9. The process in accordance with claim 1 characterized in that said iron sulfide has been reduced in sulfur content by pretreatment with hydrogen at a temperature of between 50° and 500° C. prior to use in the process and that prior to said pretreatment said iron sulfide contained more than one atomic equivalent of sulfur for each atomic equivalent of iron.

HERBERT G. TANNER.